United States Patent [19]

Yamamoto

[11] 4,302,761

[45] Nov. 24, 1981

[54] INK JET SYSTEM PRINTER OF THE CHARGE AMPLITUDE CONTROLLING TYPE CAPABLE OF PRINTING DIFFERENT SIZE CHARACTERS

[75] Inventor: Yoichi Yamamoto, Nara, Japan

[73] Assignee: Sharp Kabushiki Kaisha, Osaka, Japan

[21] Appl. No.: 68,701

[22] Filed: Aug. 22, 1979

Related U.S. Application Data

[63] Continuation of Ser. No. 837,416, Sep. 28, 1977, abandoned.

[30] Foreign Application Priority Data

Sep. 30, 1976 [JP] Japan ............................... 51-117963

[51] Int. Cl.$^3$ ............................................ G01D 15/18

[52] U.S. Cl. ...................................................... 346/75

[58] Field of Search .................... 346/75, 140; 400/120

[56] References Cited

U.S. PATENT DOCUMENTS

| | | | |
|---|---|---|---|
| 3,373,437 | 3/1968 | Sweet | 346/75 |
| 3,714,928 | 2/1973 | Taylor | 346/75 X |
| 3,747,120 | 7/1973 | Stemme | 346/75 |
| 3,956,756 | 5/1976 | Paton | 346/75 |
| 4,007,464 | 2/1977 | Bassous | 346/75 |
| 4,050,077 | 9/1977 | Yamada | 346/75 |
| 4,210,919 | 7/1980 | Alba | 346/75 |

*Primary Examiner*—Joseph W. Hartary

*Attorney, Agent, or Firm*—Birch, Stewart, Kolasch and Birch

[57] ABSTRACT

Plural streams of ink droplets are emitted from a nozzle, each stream comprising uniform size ink droplets. The size of ink droplets of the respective streams is different from each other. Charging electrodes are provided for each of the streams of ink droplets in order to charge the ink droplets included within the respective streams in accordance with a video signal. A selector is provided for allowing the application of the video signal to selected one of the charging electrodes associated with selected one of the streams of ink droplets in response to the size of characters desired to be printed.

17 Claims, 8 Drawing Figures

| | | | | | | | | |
|---|---|---|---|---|---|---|---|---|
| $b_8$ | ○ | ○ | ○ | ○ | ○ | ○ | ● | ● |
| $b_7$ | ○ | ○ | ○ | ○ | ○ | ● | ● | ● |
| $b_6$ | ○ | ○ | ● | ● | ○ | ○ | ● | ● |
| $b_5$ | ○ | ● | ○ | ● | ○ | ● | ○ | ● |

| $b_8$-$b_5$ | $b_4$ | $b_3$ | $b_2$ | $b_1$ |
|---|---|---|---|---|
| | ○ | ○ | ○ | ○ |
| | ○ | ○ | ○ | ● |
| | ○ | ○ | ● | ○ |
| | ○ | ○ | ● | ● |
| | ○ | ● | ○ | ○ |
| | ○ | ● | ○ | ● |
| | ○ | ● | ● | ○ |
| | ○ | ● | ● | ● |
| | ● | ○ | ○ | ○ |
| | ● | ○ | ○ | ● |
| | ● | ○ | ● | ○ |
| | ● | ○ | ● | ● |
| | ● | ● | ○ | ○ |
| | ● | ● | ○ | ● |
| | ● | ● | ● | ○ |
| | ● | ● | ● | ● |

| R \ C | 0 | 1 | 2 | 3 | 4 | 5 | 6 | 7 |
|---|---|---|---|---|---|---|---|---|
| 0 | | | SP | 0 | @ | P | , | p |
| 1 | | | ! | 1 | A | Q | a | q |
| 2 | | | " | 2 | B | R | b | r |
| 3 | | | # | 3 | C | S | c | s |
| 4 | | | $ | 4 | D | T | d | t |
| 5 | | | % | 5 | E | U | e | u |
| 6 | | | & | 6 | F | V | f | v |
| 7 | | | ' | 7 | G | W | g | w |
| 8 | BS | ø | ( | 8 | H | X | h | x |
| 9 | HT | | ) | 9 | I | Y | i | y |
| 10 | LF | | * | : | J | Z | j | z |
| 11 | VT | (a) | + | ; | K | [ | k | { |
| 12 | FF | (b) | , | < | L | \ | l | ¦ |
| 13 | CR | (c) | - | = | M | ] | m | } |
| 14 | | (I) | . | > | N | ^ | n | ~ |
| 15 | | (II) | / | ? | O | _ | o | ø |

FIG.5

INK JET SYSTEM PRINTER OF THE CHARGE AMPLITUDE CONTROLLING TYPE CAPABLE OF PRINTING DIFFERENT SIZE CHARACTERS

This application is a continuation, of copending application Ser. No. 837,416, filed on Sept. 28, 1977, now abandoned.

BACKGROUND OF THE INVENTION

The present invention relates to a ink jet system printer of the charge amplitude controlling type and, more particularly, to an ink jet system printer of the charge amplitude controlling type which can print different size characters without deteriorating print quality.

Generally, in an ink jet system printer of the charge amplitude controlling type, a stream of ink droplets having a given frequency is emitted from a nozzle toward a record receiving paper and each ink droplet is charged to a desired amplitude in accordance with a video signal through the use of a charging electrode. Each ink droplet is deflected in the vertical direction as it passes through a fixed high voltage field established by a pair of deflection plates in accordance with the charge amplitude carried thereon and deposited on the record receiving paper. The nozzle is carried on a carriage which is driven to travel in the horizontal direction at a fixed speed during print operation, whereby printing is performed in a dot matrix fashion.

When the gain of the video signal is increased and the velocity of the travelling carriage is increased, a size of the printed character is enlarged. Contrarily, when the gain of the video signal is decreased and the velocity of the travelling carriage is decreased, the size of the printed character becomes smaller.

When the character size is varied without varying the size of the ink droplets, dot density will vary. This will deteriorate print quality.

OBJECTS AND SUMMARY OF THE INVENTION

Accordingly, an object of the present invention is to vary the size of printed characters in an ink jet system printer of the charge amplitude controlling type.

Another object of the present invention is to provide an ink jet system printer of the charge amplitude controlling type which can vary the size of printed characters without deteriorating print quality.

Still another object of the present invention is to provide an ink jet system printer of the charge amplitude controlling type, wherein different size ink droplets are used to perform print operation in accordance with the desired size of characters to be printed.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, ink droplets of the large size are used to perform print operation when the desired size of characters to be printed is large, and ink droplets of the small size are used to perform print operation when the desired size of characters to be printed is small.

More specifically, plural streams of ink droplets are emitted from a nozzle, each stream comprising uniform size ink droplets. The size of the ink droplets of the respective streams is different from each other. Charging electrodes are provided for each of the streams of ink droplets in order to charge the ink droplets included within the respective streams in accordance with a video signal. The respective charging electrodes are electrically isolated from each other.

A selector is provided for allowing the application of the video signal to a selected one of the charging electrodes associated with a selected one of the streams of ink droplets in response to the desired size of characters to be printed. The respective charging electrodes are connected to receive video signals of different levels so that the large ink droplets are deflected to a greater degree than are the small ink droplets. In the case when the character width is also desired to be varied, the carriage carrying a printer head inclusive the nozzle is driven to travel fast when the large ink droplets are used to perform print operation and the carriage is driven to travel slow when the small ink droplets are used to perform print operation.

BRIEF DESCRIPTION OF THE DRAWINGS

The present invention will become more fully understood from the detailed description given hereinbelow the accompanying drawings which are given by way of illustration only, and thus are not limitative of the present invention and wherein.

FIG. 5 is a code chart of the character pattern ROM and the determination circuit of FIGS. 3 and 4;

DESCRIPTION OF THE PREFERRED EMBODIMENTS

Figure 1:
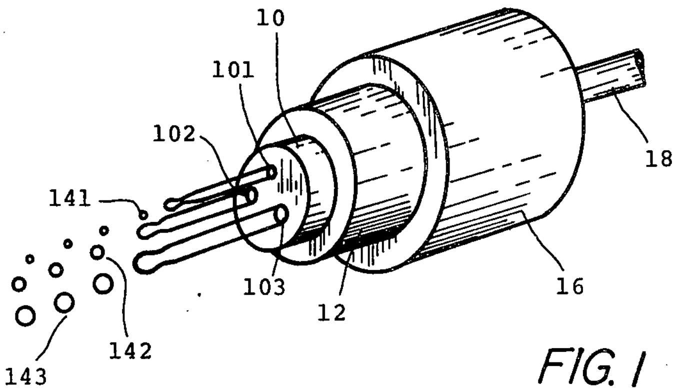
FIG. 1 is a perspective view of a nozzle unit employed within an ink jet system printer of the charge amplitude controlling type of the present invention.

FIG. 1 shows a nozzle unit employed within an ink jet system printer of the charge amplitude controlling type of the present invention.

A nozzle 10 includes three orifices 101, 102 and 103. The diameter of the orifice 101 is smaller than that of the orifice 102, and the diameter of the orifice 102 is smaller than that of the orifice 103. An electromechanical transducer 12 such as a piezo-vibrator is attached to the nozzle 10. The ink liquid issuing from the nozzle 10 is excited by the electromechanical transducer 12 so that ink droplets 141, 142 and 143 of a frequency equal to the exciting signal frequency are formed. The nozzle 10 and the electromechanical transducer 12 are held by a housing 16.

Ink liquid is sent to the nozzle 10 under a predetermined pressure from an ink liquid reservoir through a pump and a conduit 18. Although th ink droplets 141, 142 and 143 have the same frequency as the exciting signal frequency, the ink droplets 141, 142 and 143 have different phases and different sizes. The ink droplets 141 are smaller than the ink droplets 142, and the ink droplets 142 are smaller than the ink droplets 143.

The respective ink droplets 141, 142 and 143 are charged to desired levels in accordance with print information through the use of charging electrodes, and are deflected in accordance with the amplitude of charges on the droplets as they pass through a constant high-voltage electric field established by a pair of high-voltage deflection plates. The droplets are then deposited on a record receiving paper. The housing 16 and the charging electrodes are mounted on a carriage which is driven to travel at a fixed speed during print operation, whereby desired characters are printed in the dot matrix fashion.

A typical construction of a single beam ink jet system printer of the charge amplitude controlling type is disclosed in U.S. Pat. No. 4,025,926 entitled "PHASE SYNCHRONIZATION FOR INK JET SYSTEM PRINTER" issued on May 24, 1977. A typical construction of a double beam ink jet system printer of the charge amplitude controlling type is described in my copending U.S. Pat. Application Ser. No. 699,690 entitled "DOUBLE STREAM PHASE SYNCHRONIZATION IN AN INK JET SYSTEM PRINTER" filed on June 25, 1976, wherein one beam is used for print operation and the other beam is used for phase synchronization.

Three charging electrodes are provided for the respective ink streams. Video signals are applied between the nozzle 10 and the three charging electrodes in order to charge the ink droplets 141, 142 and 143 in accordance with the print information. The respective charging electrodes are electrically isolated from each other. Needless to say, the application of charging signals must be accurately timed to be in agreement with the formation of the ink droplets.

When large size characters are desired to be printed, the charging electrode associated with the large size ink droplets 143 is connected to receive the video signal to charge the large ink droplets 143 in accordance with the print information. When middle size characters are desired to be printed, the charging electrode associated with the middle size ink droplets 142 is connected to receive the video signal to charge the middle size ink droplets 142 in accordance with the print information. When small size characters are desired to be printed, the charging electrode associated with the small size ink droplets 141 is connected to receive the video signal to charge the small size ink droplets 141 in accordance with the print information.

In this way, the large size ink droplets 143 are used to perform print operation when the large size characters are desired to be printed, thereby precluding deterioration of print quality. Since the respective ink droplets 141, 142 and 143 have different phases, the charge signals applied to the charging electrodes must have different phases.

Figure 2:
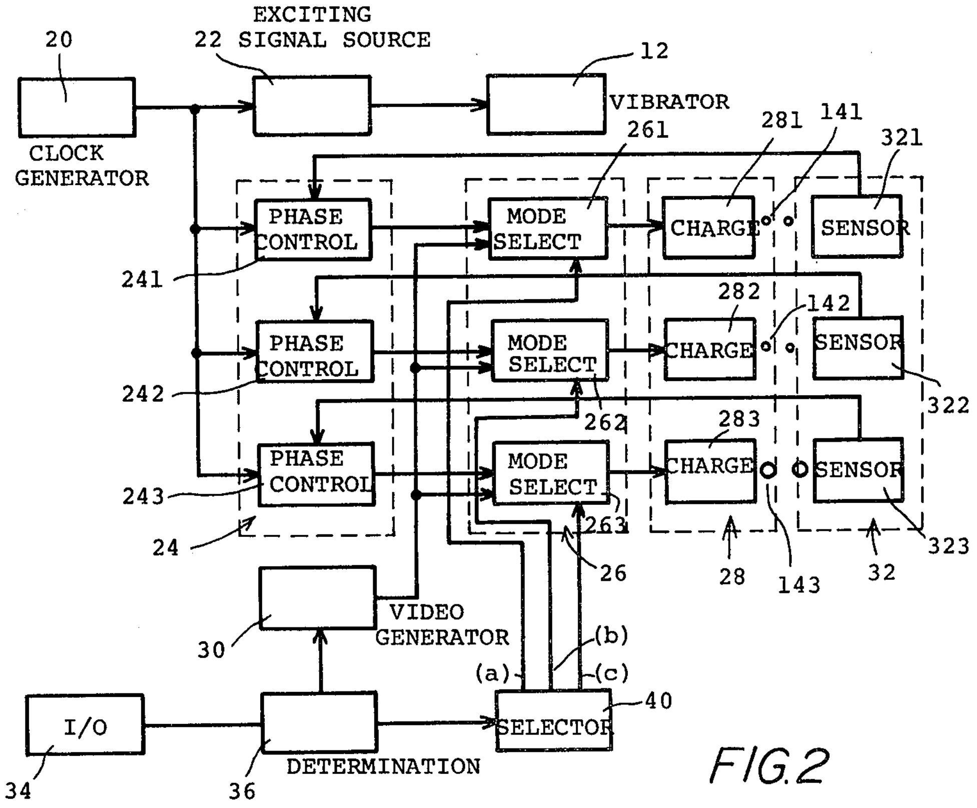
FIG. 2 is a block diagram of a charging signal generating system of an ink jet system printer of the charge amplitude controlling type of the present invention.

FIG. 2 shows a charging signal generating system of the present invention. Like elements corresponding to those of FIG. 1 are indicated by like numerals.

A clock signal generator 20 develops a clock signal of, for example, 4,000 KHz to control the operation of the system. An exciting signal source 22 is connected to receive the clock signal and mainly comprises a divider to develop an exciting signal of, for example, 50 KHz to the electromechanical transducer 12 so that the ink droplets having the frequency of 50 KHz are emitted from the nozzle 10.

The clock signal is also applied to a phase control circuit 24 which develops phase detection signal for synchronizing the application of charging signals with the formation of the ink droplets. The frequency of the charging signals is identical with that of the exciting signal applied to the electromechanical transducer 12, and the phase of the charging signals is selectable at light different phases.

The phase control circuit 24 includes phase control circuits 241, 242 and 243, which are independent of each other and are associated with the ink droplets 141, 142 and 143, respectively. The phase detection signals derived from the phase control circuit 24 are applied to a mode selector 26, which functions to select the operation mode of the ink jet system printer between the phase detection mode and the actual print mode. More specifically, the mode selector 26 functions to apply the phase detection signals derived from the phase control circuit 24 to a charging electrode unit 28 in the phase detection mode, and to apply a video signal derived from a video generator 30 to the charging electrode unit 28 in the actual print mode.

The mode selector 26 includes mode selectors 261, 262 and 263, which are independent of each other and are associated with the ink droplets 141, 142 and 143, respectively. The charging electrode unit 28 includes charging tunnels 281, 282 and 283, which are electrically isolated from each other and functions to charge the ink droplets 141, 142 and 143, respectively.

A sensor unit 32 is positioned between the charging electrode unit 28 and a pair of deflection plates in order to detect the charge amplitude carried on the phase detection ink droplets. The sensor unit 32 includes sensors 321, 322 and 323, which are electrically isolated from each other. A typical construction of the sensor is disclosed in U.S. Pat. No. 3,836,912 entitled "DROP CHARGE SENSING APPARATUS FOR AN INK JET PRINTING SYSTEM" issued on Sept. 17, 1974.

Detection outputs of the sensors 321, 322 and 323 are fed back to the phase control circuits 241, 242 and 243, respectively, to perform the phase synchronization operation. A typical phase synchronization system is disclosed in U.S. Pat. No. 4,025,926. It must be noted that the respective ink droplets 141, 142 and 143 have different phases. Accordingly, the phase synchronization must be conducted for the respective ink droplets 141, 142 and 143.

Print information and inclusive character information and function information is introduced through an input/output interface 34 to a determination circuit 36. The determination circuit 36 includes a character pattern ROM 38 of which output signals are applied to the video generator 30. The function information is detected by the determination circuit 36 to place the ink jet system printer in a desired operation mode.

Character size determination signals derived from the determination circuit 36 are applied to a selector 40 which functions to enable any one of the mode selectors 261, 262 and 263.

Figure 3:
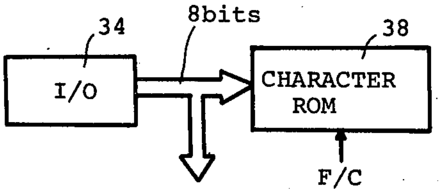
FIG. 3 is a block diagram of an I/O interface and a character pattern ROM included within the charging signal generating system of FIG. 2.

The input/output interface 34 develops the character information and the function information in the format of a digital signal of eight bits. The character information is applied to the character pattern ROM 38 as shown in FIG. 3.

Figure 4:
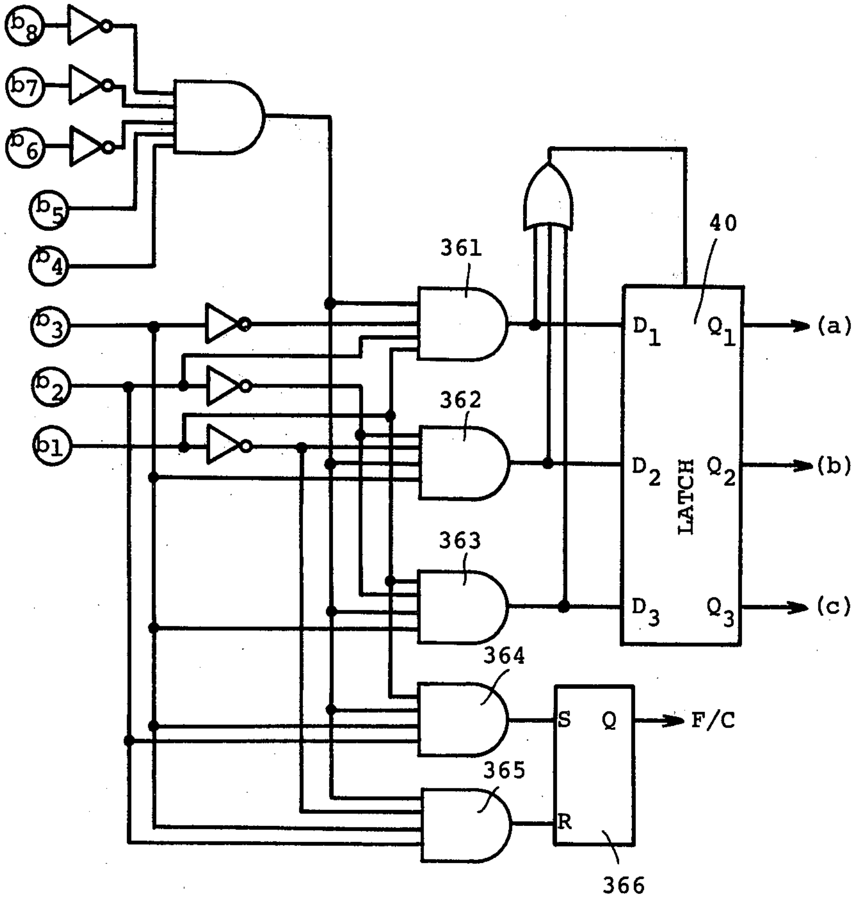
FIG. 4 is a block diagram of a determination circuit and a selector included within the charging signal generating system of FIG. 2.

FIG. 4 shows a portion of the determination circuit 36 and the selector 40. FIG. 4 shows the detection logic of the function information derived from the input/output interface 34.

The eight bit digital signal $b_1$ through $b_8$ is applied to the determination circuit 36 in a parallel fashion. The function information includes the information determining the size of characters to be printed and the information related to the fine matrix (32×32) and the coarse matrix (7×9).

When the eight bit digital signal $b_1$ through $b_8$ is "11011000", an AND gate 361 develops a signal of the high level, which is applied to the selector 40 comprising a latch circuit, which develops a signal (a) from the terminal $Q_1$. The signal (a) functions to select the ink droplets 141 for print operation. When the eight bit digital signal $b_1$ through $b_8$ is "00111000", an AND gate 362 develops a signal to generate a signal (b) from the terminal $Q_2$ of the selector 40. The signal (b) functions to select the ink droplets 142 for print operation. When the eight bit digital signal $b_1$ through $b_8$ is "10111000", an AND gate 363 develops a signal to generate a signal (c) from the $Q_3$ terminal of the selector 40. The signal (c) functions to select the ink droplets 143 for print operation.

An AND gate 364 develops a signal to set a flip-flop 366 when the eight bit digital signal $b_1$ through $b_8$ is "11111000". The Q output of the flip-flop 366 functions to select the fine matrix. An AND gate 365 develops a signal to reset the flip-flop 366 when the eight bit digital signal $b_1$ through $b_8$ is "01111000". The $\overline{Q}$ output of the flip-flop 366 functions to select the coarse matrix.

FIG. 5 shows a code chart of the above-mentioned character pattern ROM 38 and the determination circuit 36 of FIG. 4. The eight bit digital signal $b_1$ through $b_8$ is derived from the input/output interface 34.

Figure 6:
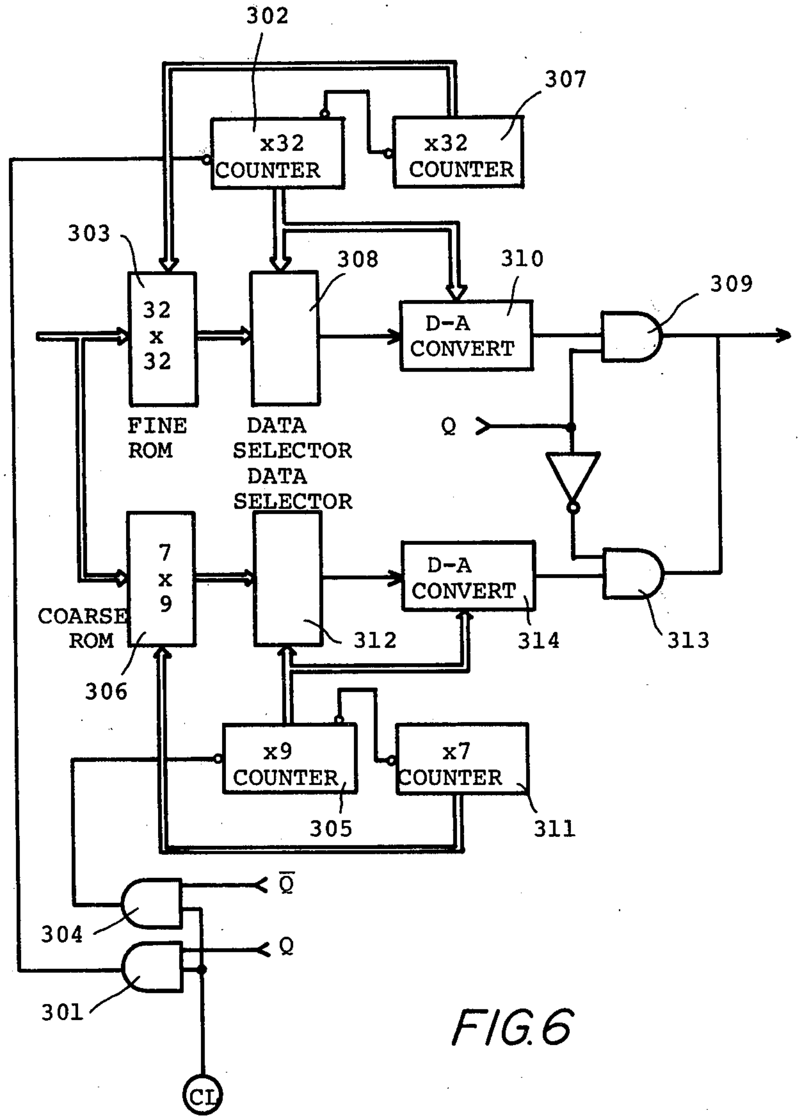
FIG. 6 is a block diagram of a video generator included within the charging signal generating system of FIG. 2.

FIG. 6 shows the video generator 30.

When the flip-flop 366 is set, the Q output of the flip-flop 366 is introduced into an AND gate 301, of which an output signal is introduced into a counter 302 of radix thirty-two (32) to enable a fine matrix ROM 303. When the flip-flop 366 is reset, the $\overline{Q}$ output of the flip-flop 366 is introduced into an AND gate 304, of which an output signal is introduced into a counter 305 of radix nine (9) to enable a coarse matrix ROM 306.

Output signals of the counter 302 are applied to a counter 307 of radix thirty-two (32) and a data selector 308 to access the fine matrix ROM 303. The fine matrix ROM 303 receives the character information of eight bits from the input/output interface 34, and develops character format information of thirty-two bits in a parallel fashion. The data selector 308 functions to convert the character format information into a serial digital signal. The serial digital signal derived from the data selector 308 is applied to an analog gate 309 through a digital-to-analog converter 310.

Output signals of the counter 305 are applied to a counter 311 of radix seven (7) and a data selector 312 to access the coarse matrix ROM 306. The coarse matrix ROM 306 receives the character information of eight bits from the intput/output interface 34, and develops character format information of nine bits in a parallel fashion. The data selector 312 functions to convert the character format information into a serial digital signal. The serial digital signal derived from the data selector 312 is applied to an analog gate 313 through a digital-to-analog converter 314. Either one of the analog gates 309 and 313 are conductive through the use of the Q and $\overline{Q}$ outputs of the flip-flop 366.

Figure 7:
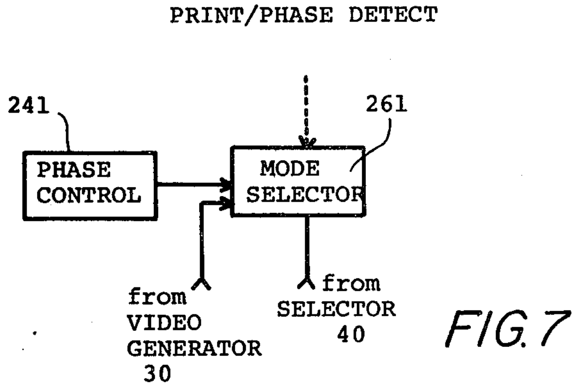
FIG. 7 is a block diagram of a phase control circuit and a mode selector included within the charging signal generating system of FIG. 2.
Figure 8:
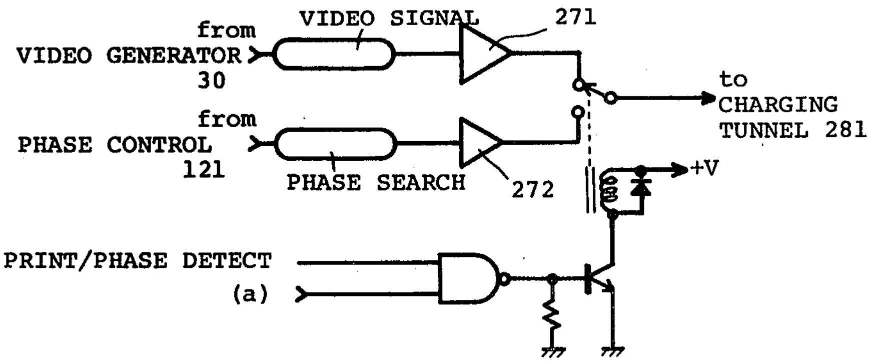
FIG. 8 is a circuit diagram of the mode selector of FIG. 7.

FIGS. 7 and 8 show the mode selector 261.

The mode selector 261 receives the phase search pulse from the phase control circuit 241, the video signal from the video generator 30, the character size signal (a) from the selector 40, and a control signal for selecting the operation mode between the actual print mode and the phase synchronization mode.

The video signal derived from the video generator 30 is applied to the charging tunnel 281 through an amplifier 271 only when the control signal selects the actual print mode and the character size signal (a) bears the high level. In other operation modes, the phase search pulse is applied to the charging tunnel 281 through another amplifier 272.

The mode selector 262 and 263 are same constructions as the mode selector 261 except for the fact that the mode selecter 262 receives the phase search pulse from the phase control circuit 242 and the character size signal (b), and the mode selector 263 receives the phase search pulse from the phase control circuit 243 and the character size signal (c).

The invention being thus described, it will be obvious that the same may be varied in many ways. Such variations are not to be regarded as a departure from the spirit and scope of the invention, and all such modifications are intended to be included within the scope of the following claims.

What is claimed is:

1. An ink jet system printer of the charge amplitude controlling type for emitting charged droplets from an ink droplet issuance unit directed toward a record receiving medium, and selectively deflecting said ink droplets in accordance with said charge carried thereon as said droplets pass through a constant high voltage electric field established by said deflecting means, thereby printing desired symbols of a predetermined size on said record receiving medium in a dot-matrix fashion comprising:

emitting means for emitting a plurality of ink streams from said ink droplet issuance unit which vary in size and electric charge according to said size of said symbols to be printed;

each of said ink streams emitted from said emitting means comprising a plurality of ink droplets and each of said ink droplets associated with a selected one of said ink streams having a size which is different than the size of each of said droplets associated with either of said remaining ink streams;

a plurality of charging electrode means at one end of said ink droplet issuance unit for generating a plurality of charging signals thereby applying an electric charge having a predetermined amplitude to each of said droplets associated with said respective ink streams;

each of said charging electrode means corresponding to a respective one of said ink streams and said amplitude of said charge possessed by each of said ink droplets varying proportionately with said size of said symbols to be printed;

wherein each of said plurality of charging signals generated by said plurality of charging electrode means have different phases relative to one another, the phases of each of said charging signals being separately and independently controllable; and wherein one of said plurality of ink streams comprising ink droplets of a predetermined size is selected for printing purposes in accordance with said size of said symbols to be printed, one of said charging signals being selected to charge the ink droplets of said one of said plurality of ink streams, the ink droplets of the remaining ink streams emitted from said emitting means being precluded from receiving an electric charge from said charging signals generated by said charging electrode means.

2. The ink jet system printer of the charge amplitude controlling type of claim 1, further comprising:

selection means for applying charging signals related to said print information to one of said charging electrodes in accordance with the size of a character to be printed from said print information.

3. The ink jet system printer of the charge amplitude controlling type of claim 1, wherein said emitting means comprises a nozzle means having a plurality of orifice means of different diameters for emitting a plurality of ink droplets, said plurality of ink droplets each having different sizes; and an electromechanical transducer means for exciting said nozzle means thereby providing said ink droplets with a given frequency of emittance.

4. The ink jet system printer of the charge amplitude controlling type of claim 1, further comprising:

a video generator means having an output signal for developing character format information of at least two different matrix patterns, said output signal of said video generator being applied to said charging electrode means.

5. The ink jet system printer of the charge amplitude controlling type of claim 4, wherein said at least two different matrix patterns comprise a $32\times32$ matrix pattern and a $7\times9$ matrix pattern.

6. The ink jet system printer of the charge amplitude controlling type of claim 4 further comprising means for selecting a desired matrix pattern for developing a video signal of a desired character format.

7. In an ink jet system printer of the charge amplitude controlling type which emits charged ink droplets from an ink droplet issuance unit toward a record receiving medium through the use of charging means, said charge on said ink droplet having a certain amplitude of intensity corresponding to information to be printed, and which selectively deflects said ink droplets in accordance with said amplitude of said charges carried thereon as said droplets pass through a constant high voltage electric field established by said deflection means, thereby printing desired symbols on said record receiving medium in a dot matrix fashion, the improvement comprising:

nozzle means in said ink droplet issuance unit for emitting ink droplets of different sizes, said nozzle means including a plurality of different sized orifices for emitting a plurality of ink streams which vary in size in accordance with said information to be printed; and selection means for selecting one of said plurality of different sized orifices to emit one of said plurality of ink streams of a selected size in accordance with said information, having a corresponding size of characters, to be printed.

8. An ink jet system printer of the charge amplitude controlling type comprising:

an ink droplet issuance means emitting ink droplets from one end thereof, said ink droplet issuance unit means having a plurality of different sized orifice means on said one end thereof for emitting a plurality of different sized droplets;

a plurality of charging electrode means at said one end of said issuance unit means for providing each of said ink droplets with a predetermined electric charge, said charge having a specific amplitude of intensity;

determination means for determining the size of characters to be printed and providing a resulting determination signal in response thereto;

means responsive to said determination signal for applying a video signal of a predetermined magnitude to a predetermined one of said charging electrodes in accordance with said resulting determination signal and in synchronism with formation of said ink droplets at said one end of said ink droplets issuance unit; and said video signal having a magnitude controlling said amplitude of said electric charges possessed by said ink droplets.

9. An ink jet system printer of the charge amplitude controlling type in accordance with claim 8, wherein said ink droplet issuance unit means further comprises:

a nozzle means having a plurality of different sized orifices at one end thereof;

an electromechanical transducer means attached to said nozzle means for providing vibratory motion to said nozzle means; and a housing surrounding said nozzle means and said transducer means; and wherein said plurality of charging electrode means is located in front of said nozzle means for imposing said electric charge on each of said ink droplets emitted from said nozzle means.

10. An ink jet system printer of the charge amplitude controlling type in accordance with claim 8, wherein said means for applying a video signal comprises:

an input clock generator/vibrator means for generating ink droplets from said droplet issuance unit at a given emitting frequency;

an output sensing means responsive to the generation of said ink droplets by said generator/vibrator means for sensing the frequency of emittance of said electric charges possessed by said ink droplets being emitted from said droplet issuance unit;

determination means responsive to the size of characters to be printed for generating character size determination signals;

means responsive to said character size determination signals for generating video signals in response thereto, said video signals representing print data information and indicative of said size of said characters to be printed;

said video signals being applied to one of said charging electrode means;

means responsive to said clock generator/vibrator means and said sensing means for developing phase detection signals indicative of a specific point in time when said ink droplets will be formed; and synchronizing means responsive to said phase detection signal and said video signal for synchronizing the application of said video signal at a specific one of said charging electrodes with the formation of said ink droplets at said one end of said ink droplet issuance unit means as indicated by said phase detection signals.

11. An ink jet system printer of the charge amplitude controlling type in accordance with claim 10 further comprising:

means for selectively enabling one of said plurality of different sized orifice means on said ink droplet issuance unit means, said means for enabling further comprising input/output interfacing means responsive to the size of characters to be printed for generating character and function information in the form of a binary digital signal; and selector means responsive to an inverted version of said binary digital signal generated by said input/output interfacing means for generating a plurality of enabling signals, each of said plurality of enabling signals being capable of enabling a respective one of said plurality of different sized orifice means thereby emitting ink droplets of a predetermined size according to said size of said characters to be printed.

12. An ink jet system printer of the charge amplitude controlling type in accordance with claim 11, wherein said selector means comprises a plurality of AND gate means responsive to said inverted version of said binary digital signal generated by said input/output interfacing means for developing intermediary digital signals; and latch circuit means responsive to said intermediary digital signals for developing said plurality of enabling signals.

13. The invention of claim 12, wherein said synchronizing means comprises a plurality of mode select circuit means, each of said plurality of mode select circuit means being individually responsive to said phase detection signals, said video signal, and said enabling signal; and each mode select circuit means being individually connected to a selected one of said different sized orifices thereby permitting ink droplets of a predetermined size to be emitted from said orifice.

14. An ink jet system printer of the charge amplitude controlling type in accordance with claim 11, wherein said synchronizing means comprises a plurality of mode select circuit means, each of said plurality of mode select circuit means being individually responsive to said phase detection signals, said video signal, and said enabling signal; and each mode select circuit means being individually connected to a selected one of said different sized orifices thereby permitting ink droplets of a predetermined size to be emitted from said orifice.

15. The invention of claim 10, wherein said ink droplet issuance unit means further comprises:

a nozzle means having a plurality of different sized orifices at one end thereof;

an electromechanical transducer means attached to said nozzle means for providing vibratory motion to said nozzle means; and a housing surrounding said nozzle means and said transducer means; and wherein said plurality of charging electrode means is positioned in front of said nozzle means for imposing said electric charge on each of said ink droplets emitted from said nozzle means.

16. The invention of claim 15, further comprising:

means for selectively enabling one of said different sized orifice means on said ink droplet issuance unit means, said means for enabling further comprising:

input/output interfacing means responsive to the size of characters to be printed for generating character and function information in the form of a binary digital signal; and selector means responsive to an inverted version of said binary digital signal for generating a plurality of enabling signals, each of said plurality of enabling signals being capable of enabling a respective one of said plurality of different sized orifice means thereby emitting ink droplets of a predetermined size according to said size of said characters to be printed.

17. The invention of claim 16, wherein said selector means comprises a plurality of AND gate means responsive to said inverted version of said binary digital signal for developing intermediary digital signals; and latch circuit means responsive to said intermediary digital signals for developing said plurality of enabling signals.

* * * * *